INVENTOR.
Harold M. Weissman
BY
Paul J. Ethington
ATTORNEY

United States Patent Office 3,235,757
Patented Feb. 15, 1966

3,235,757
GAS MAGNETIC THRUST BEARING
Harold M. Weissman, Peabody, Mass., assignor to General Motors Corporation, Detroit, Mich., a corporation of Delaware
Filed Mar. 28, 1962, Ser. No. 183,182
4 Claims. (Cl. 310—90)

This invention relates to thrust bearings for resisting thrust forces of a gyro inertial element along its spin axis and more particularly to such bearings utilizing gas and magnetic forces.

In gyroscopic applications it is desirable that the gyro inertial element spin in a reference plane and have means for resisting axial loading or thrust forces along its spin axis. Thus thrust bearings are frequently used in conjunction with the inertial element for resisting the thrust forces. However, one problem encountered in such bearings is friction due to mechanical contact between the bearing member and the thrust plate member.

In accordance with this invention, a gas magnetic thrust bearing is provided for resisting thrust forces along the spin axis of a rotatable element whereby no mechanical frictional contact is encountered. The bearing comprises a thrust plate member of magnetic material secured to and rotatable with a rotatable element and disposed in close proximity with a stationary thrust plate member of magnetic material defining a spacing therebetween. Gas under pressure in the spacing provides a repelling force since it tends to push the members apart whereas magnetic forces in the spacing provide attractive forces tending to pull the members together. Driving means including the members provides rotation of the rotatable element about its spin axis. The attractive and repelling forces are adjusted so as to be equal and opposite at a predetermined axial spacing between the members whereby axial displacements of one of the members with respect to the other due to external forces are resisted. The bearing may take the form of a gas magnetic thrust bearing described in a co-pending application Ser. No. 183,158 filed concurrently herewith by Harold M. Weissman for Thrust Bearing.

A more complete understanding of this invention may be had from the detailed description which follows taken with the accompanying drawing in which.

Figure 1:
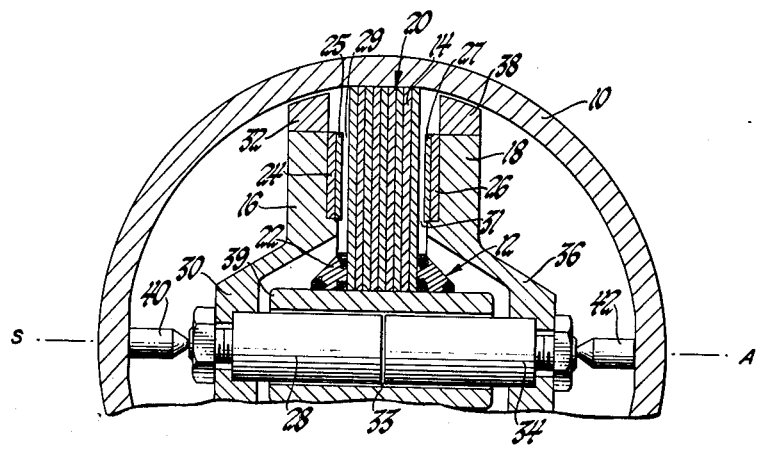
FIGURE 1 is a sectional view showing one embodiment of the invention.

Referring now to the drawing and more particularly to FIGURE 1, there is shown a gyroscope casing 10 filled wtih fluid and having encased therein an axial gap hysteresis motor 12. The motor 12 comprises a stator 14, which serves as a stationary thrust plate, secured to the casing 10 and annular hysteresis rings 24 and 26 mounted on independenly rotable rotors 16 and 18 having a spin axis SA. The rotor 16 comprises a cylindrical rotor member 28, a body portion 30 and an annular gyro inertial element 32. The rotor 18 comprises a cylindrical rotor member 34, a body portion 36 and an annular gyro inertial element 38. The hysteresis rings 24 and 26, which may be of conventional design such as hard magnetic steel exhibiting a high hysteretic constant, also serve as rotatable thrust plates. The stator 14 comprises a cylindrical hollow journal bearing 39 adapted for journalling the members 28 and 34, a cylindrical laminated core member 20 of magnetic material secured to the casing 10 and a polyphase distributed winding 22 of conventional winding arrangement and configuration. A spacing 33 is defined between members 28 and 34 narrower in length than either spacing 29 or 31. The hysteresis rings 24 and 26 are provided with non-magnetic coatings 25 and 27 respectively defining spacings 29 and 31 with the core member 20. Limit stops 40 and 42 suitably secured to the casing 10 limit axial displacement of rotors 16 and 18.

In the operation of the hysteresis motor 12, alternating current is applied to the stator windings 22 to establish a rotating field in the hysteresis rings 24 and 26 whereby hysteresis causes the flux density to lag behind the magnetic intensity. The phase angle between stator magnetomotive force and the resultant flux give rise to an impelling force producing a torque so as to pull the inertial rings 32 and 38 into synchronism with the rotating field.

It is desirable in the design of the gas magnetic thrust bearing that the starting torque requirements for the hysteresis motor 12 be small enough for the motor to supply. The requirements are met due to the narrowness of the spacing 33 with respect to the spacings 29 and 31. The spacing 33 permits the magnetic forces acting on the rotors 16 and 18 to be balanced by rotor to rotor contact at the spacing 33 rather than rotor to stator contact at the spacings 29 and 31.

When the motor 12 is energized providing rotative force to the rotors 16 and 18, hydrodynamic gas pressure will be developed in the spacings 29 and 31. The pressure is developed due to the angular velocity of the rotors 16 and 18 and the narrowness of the spacings 29 and 31. The pressure will increase with increases in angular velocity of the rotors 16 and 18 and with decreases in the narrowness of the spacings 29 and 31. This pressure may be considered as a repelling force since it tends to push the rotors 16 and 18 from the core member 20. The repelling force is opposed by attractive magnetic forces in the spacings 29 and 31 due to the magnetic flux developed by the hysteresis motor 12. If the rotors 16 and 18 are axially displaced until the attractive and repelling forces are equal in magnitude and opposite in direction the spacings 29 and 31 will correspond to a null or no-load condition of the bearings. The null position may be adjusted for the desired length of spacings 29 and 31 by varying the attractive and repelling forces. The attractive forces may be varied by varying the excitation of the hysteresis motor 12 and the repelling forces may be varied by varying the angular velocity of the rotors 16 and 18. The non-magnetic coatings 25 and 27 permit the attractive forces in spacings 29 and 31, respectively, to be maintained constant over the total range of gas bearing operation.

Figure 2:
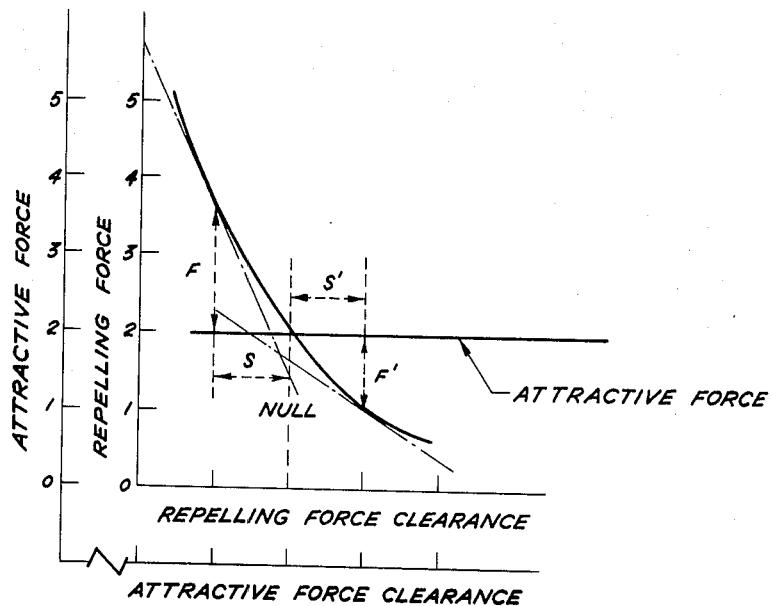
FIGURE 2 is a graphical representation showing the relationship between magnetic and gas forces with respect to bearing clearance.

In operation, when the rotors 16 and 18 are in their null position any external forces acting thereon tending to displace the rotors along their spin axis SA will be opposed by the attractive and repelling forces in the spacings 29 and 31. This is more readily understood by reference to FIGURE 2 which shows a graphical representation of attractive force versus the attractive force clearance and of repelling force versus the repelling force clearance for one gas magnetic bearing. Considering only the bearing on the left in FIGURE 1 the repelling force clearance is equal to the length of the spacing 29 whereas the attractive force clearance is equal to the length of the spacing 29 plus the thickness of the coating 25. The repelling force varies exponentially with variations in the length of the spacing 29 whereas the attractive force is maintained constant due to the coating 25. The intersection of the curve of repelling force with the curve of attractive force represents the null or no-load condition of the bearings. It is seen from FIGURE 2 that if an external force acts to displace the rotor 16 along its spin axis SA a distance S so as to decrease the spacing 29 an increased repelling force F will result opposing such displacement. Conversely, if an external force acts to displace the rotor 16 along its spin axis SA a distance S' so as to increase the spacing 29 a decreased repelling force F' will result whereby the attractive force will predominate opposing such displacement. It is seen that the stiffness of the gas magnetic bearing, i.e. the ability of the bearing to resist thrust forces in two opposing axial directions, may be increased by increasing the level of attractive force in the spacing 29 since the slope of the curve representing repelling force is steeper for higher values of attractive force than for lower values. Thus the gas magnetic bearing may be preloaded by varying the excitation of the hysteresis motor 12.

Although the description of this invention has been given with respect to a particular embodiment, it is not to be construed in a limiting sense. Numerous variations and modifications within the spirit and scope of the invention will now occur to those skilled in the art. For a definition of the invention, reference is made to the appended claims.

I claim:
1. A gas magnetic thrust bearing for resisting axial displacement due to thrust forces along the spin axis of a rotating member comprising a rotatable member having a spin axis, a first thrust plate of magnetic material of high hysteretic constant mounted upon the member so as to be axially symmetrical and rotatable with the member, a stationary thrust plate of magnetic material located in close proximity to the first thrust plate, the first thrust plate having a substantially uniform coating of non-magnetic material thereon defining a spacing with the stationary thrust plate, means for providing a rotating magnetic field between the thrust plates thereby to rotate said first plate and to provide attractive magnetic forces between the plates, a gaseous medium in the spacing, the plates coacting together with the gaseous medium to develop gas pressure in the spacing for providing repelling forces between the plates, the plates being normally co-axially displaced from each other so that the attractive and repelling forces are balanced when no external forces act on the rotatable member tending to displace it along its spin axis, the attractive and repelling forces coacting together to resist displacements of the rotatable member along its spin axis due to external forces acting thereon.

2. A gas magnetic thrust bearing for resisting axial displacements due to thrust forces along the spin axis of a rotating gyro inertial element comprising a symmetrical gyro inertial element having a central spin axis, a first annular thrust plate of magnetic material of high hysteretic constant fixed to the element and symmetrical about the spin axis, a stationary thrust plate of magnetic material disposed adjacent and facing the first thrust plate, the first thrust plate having a substantially uniform coating of non-magnetic material thereon defining an axial spacing with respect to the stationary thrust plate, means for providing a rotating magnetic field between the plates thereby to rotate the first plate and to provide attractive magnetic forces between the plates, a gaseous medium in the spacing, whereby rotation of the plates develops gas pressure in the spacing for providing repelling forces between the plates, the plates being coaxially displaced from each other so that the attractive and repelling forces are balanced when no external forces act on the element tending to displace it along its spin axis, the attractive and repelling forces coacting together to resist displacements of the element along its spin axis due to external forces acting thereon.

3. A combination gas magnetic bearing and drive system comprising a rotor element having a spin axis normal thereto and being symmetrical about the spin axis, an axial support member fixed to the rotor element and extending along the spin axis, bearing means surrounding a portion of the axial member for providing radial restraint to the rotor element, means defining a first annular thrust surface mounted on the rotor member symmetrically about the spin axis and composed of a material having a relatively high hysteretic constant, means defining a second thrust surface of magnetic material non-rotatably disposed adjacent and spaced from the first thrust surface, the first thrust surface having a substantially uniform coating of non-magnetic material thereon to define an axial spacing with respect to the second thrust surface, means for providing a rotating magnetic field between the first and second thrust surfaces tending to rotate the rotor element in synchronism therewith and to develop attractive forces between the surfaces to provide axial restraint on the rotor element in one direction, a gaseous medium in said spacing for producing gas pressure forces when the rotor element is rotated to provide axial restraint on the rotor element in the opposite direction, the rotor element being freely mounted along the spin axis to assume a position wherein the magnetic and gas pressure forces are equalized.

4. A combination gas magnetic bearing and drive for a gyro system comprising first and second rotor wheels having a common spin axis normal thereto and being symmetrical about the spin axis, first and second axial support members fixed to the first and second rotor wheels respectively and extending along the spin axis toward one another but normally separated by a first predetermined spacing, bearing means surrounding a portion of each of the support members for providing radial restraint to the rotor elements, means defining a first annular thrust surface mounted on the first rotor member symmetrically about the spin axis and composed of a material having a relatively high hysteretic constant, means defining a second annular thrust surface mounted on the second rotor member symmetrically about the spin axis and composed of a material having a relatively high hysteretic constant, an annular core element of magnetic material non-rotatably disposed symmetrically about the spin axis and centrally of the first and second thrust surfaces to define third and fourth thrust surfaces cooperative with the first and second surfaces, respectively, to define second and third predetermined spacings between the first and third and the second and fourth thrust surfaces respectively, means for establishing a rotating magnetic field between the core element and the first and second thrust surfaces tending to rotate the rotor elements in synchronism with the field and providing attractive forces between the core element and the first and second thrust surfaces, a gaseous medium in the second and third spacings for producing gas pressure forces on the rotor elements tending to repel the rotor elements from the core element, the first spacing being less than the second and third spacings such that axial displacement of the rotor elements toward the core element causes the support means to come into contact thereby to prevent contact between said thrust surfaces.

References Cited by the Examiner
UNITED STATES PATENTS

| | | | |
|---|---|---|---|
| 2,809,526 | 10/1957 | Lundberg | 308—10 |
| 2,889,474 | 6/1959 | Macks | 310—90 |
| 3,026,151 | 3/1962 | Buchhold | 308—10 |

ORIS L. RADER, *Primary Examiner.*

MILTON O. HIRSHFIELD, *Examiner.*